US012560386B2

(12) United States Patent
Alahyari et al.

(10) Patent No.: US 12,560,386 B2
(45) Date of Patent: Feb. 24, 2026

(54) OSCILLATING HEAT PIPES

(71) Applicant: Hamilton Sundstrand Corporation, Charlotte, NC (US)

(72) Inventors: Abbas A. Alahyari, Glastonbury, CT (US); Jinliang Wang, Ellington, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 514 days.

(21) Appl. No.: 16/791,471

(22) Filed: Feb. 14, 2020

(65) Prior Publication Data
US 2021/0254899 A1 Aug. 19, 2021

(51) Int. Cl.
*F28D 15/02* (2006.01)
*B33Y 80/00* (2015.01)

(52) U.S. Cl.
CPC ..... *F28D 15/0208* (2013.01); *F28D 15/0241* (2013.01); *F28D 15/0266* (2013.01); *B33Y 80/00* (2014.12); *F28D 15/0275* (2013.01)

(58) Field of Classification Search
CPC .. F28D 15/02; F28D 15/0208; F28D 15/0241; F28D 15/0266; B33Y 80/00
See application file for complete search history.

(56) References Cited

U.S. PATENT DOCUMENTS

| | | | | |
|---|---|---|---|---|
| 3,801,843 A | * | 4/1974 | Corman | H02K 9/225 |
| | | | | 310/52 |
| 6,269,865 B1 | * | 8/2001 | Huang | F28D 15/0266 |
| | | | | 165/104.26 |
| 6,508,302 B2 | * | 1/2003 | Ishida | B21C 37/151 |
| | | | | 165/104.21 |
| 6,840,310 B2 | * | 1/2005 | Tonosaki | G06F 1/203 |
| | | | | 165/104.21 |
| 7,352,580 B2 | * | 4/2008 | Tsai | F28D 15/0266 |
| | | | | 165/104.29 |

(Continued)

FOREIGN PATENT DOCUMENTS

| | | | | |
|---|---|---|---|---|
| CN | 201138148 Y | | 10/2008 | |
| CN | 201803624 U | * | 4/2011 | ......... F28D 15/0266 |

(Continued)

OTHER PUBLICATIONS

Translation of Chinese Patent Document CN102759291A entitled Translation—CN102759291A (Year: 2012).*

(Continued)

*Primary Examiner* — Paul Alvare

(57) ABSTRACT

An oscillating heat pipe device can include a body formed to be at least partially flexible, one or more channels within the body and defined by the body, an evaporator portion within the body at a first end of the one or more channels and in fluid communication with the one or more channels, and a condenser portion within the body at a second end of the one or more channels and in fluid communication with the one or more channels. The body can be configured to flex between the evaporator portion and the condenser portion. The device can include a heat transfer fluid trapped within the channels to transfer heat between the evaporator portion and the condenser portion.

15 Claims, 4 Drawing Sheets

(56)                    References Cited

U.S. PATENT DOCUMENTS

|  |  |  |  |  |
|---|---|---|---|---|
| 8,042,606 | B2* | 10/2011 | Batty | F28D 15/0233 |
|  |  |  |  | 165/104.26 |
| 9,921,003 | B2* | 3/2018 | Monson | H05K 7/20336 |
| 10,366,817 | B2* | 7/2019 | Kim | F28D 15/0241 |
| 10,684,603 | B2* | 6/2020 | Kim | B29C 48/2522 |
| 11,043,876 | B2* | 6/2021 | Bodla | B64D 27/24 |
| 2003/0064017 | A1* | 4/2003 | Tobita | C01B 32/20 |
|  |  |  |  | 423/447.2 |
| 2005/0180109 | A1 | 8/2005 | Miyazaki et al. |  |
| 2008/0099186 | A1 | 5/2008 | Yu et al. |  |
| 2011/0067843 | A1* | 3/2011 | Vasiliev, Jr. | F28D 15/0233 |
|  |  |  |  | 165/104.26 |
| 2011/0209864 | A1 | 9/2011 | Figus et al. |  |
| 2018/0031329 | A1 | 2/2018 | Wang et al. |  |
| 2018/0322995 | A1 | 11/2018 | Kim et al. |  |
| 2019/0315501 | A1 | 10/2019 | Duong et al. |  |
| 2020/0248014 | A1* | 8/2020 | Bougher | B29B 11/10 |
| 2021/0231301 | A1* | 7/2021 | Hikmet | F21V 29/74 |
| 2021/0323222 | A1* | 10/2021 | Schadel | B33Y 10/00 |

FOREIGN PATENT DOCUMENTS

|  |  |  |  |
|---|---|---|---|
| CN | 102759291 A | * | 10/2012 |
| EP | 3168562 A1 |  | 5/2017 |
| EP | 3246648 A1 |  | 11/2017 |

OTHER PUBLICATIONS

Translation of Chinese Patent Document CN201803624U entitled Translation—CN201803624U (Year: 2011).*

Extended European search report issued in corresponding EP application No. 21155287.2 , Dated Jun. 17, 2021.

* cited by examiner

OSCILLATING HEAT PIPES

FIELD

This disclosure relates to oscillating heat pipes, e.g., for thermal transfer applications.

BACKGROUND

Oscillating heat pipes (OHPs) are passive, two-phase heat transfer devices that can effectively transfer large amounts of thermal energy with low thermal resistances. Conventional OHPs are either rigid or are made flexible by inserting a flexible bellows section between the evaporator heat input section and the condenser heat output section which are made of metal. Heat pipes are made from a wide range of metal materials and use a variety of working fluids depending on the application.

Such conventional methods and systems have generally been considered satisfactory for their intended purpose. However, there is still a need in the art for improved OHPs. The present disclosure provides a solution for this need.

SUMMARY

An oscillating heat pipe device can include a monolithic body formed to be at least partially flexible, one or more channels within the body and defined by the body, an evaporator portion within the body and in fluid communication with the one or more channels, and a condenser portion within the body spaced from the evaporator portion and in fluid communication with the one or more channels. The body can be configured to flex at least between the evaporator portion and the condenser portion. The device can include a heat transfer fluid trapped within the channels to transfer heat between the evaporator portion and the condenser portion.

The body can be made at least partially of a flexible material in certain embodiments. For example, the flexible material can include at least one of silicone or elastomeric polyurethane. Any other suitable material is contemplated herein (e.g., Polyether block Amide (PEBA), any suitable dielectric, etc.).

In certain embodiments, the material can be thermally insulative. The heat transfer coefficient of the device can be higher than the thermally insulative material alone. For example, a dimension of the one or more channels and a thickness of the body can be selected to act as thermal conductor. In certain embodiments, the dimension of the one or more passages can include between about 0.5 mm to about 5 mm, and the thickness of the body can be about between about 1 mm to about 10 mm total. In certain embodiments, the material can be electrically insulative.

The body can be shaped to be conformal to a structure. For example, the body can include a clip shape. Any other suitable shape is contemplated herein.

The one or more channels can include a plurality of channels oriented parallel or otherwise complementary to each other. The condenser portion and the evaporator portion can include one or more cross-channels extending at least partially transverse to and fluidly connected to at least a plurality of the one or more channels. In certain embodiments, the one or more cross-channels can include a plurality of cross-channels.

In accordance with at least one aspect of this disclosure, an electrical apparatus can include one or more electrical components that generate heat in use, and an oscillating heat pipe device disposed on the one or more electrical components and configured to transfer heat from the one or more electrical components. The device can be any suitable device disclosed herein (e.g., described above).

In certain embodiments, the one or more electrical components can include one or more windings of an electric motor. The device can be compliantly disposed around the one or more windings to clip to the one or more windings (e.g., to apply a retaining force thereto).

In certain embodiments, the condenser can be disposed on an outer surface of the one or more windings, and the evaporator can be disposed on an inner surface of the one or more windings. In certain embodiments, the evaporator can be sandwiched between a plurality of windings of the one or more windings.

In accordance with at least one aspect of this disclosure, a method can include additively manufacturing a flexible oscillating heat pipe device out of a flexible material. The flexible material can include at least one of silicone or elastomeric polyurethane. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
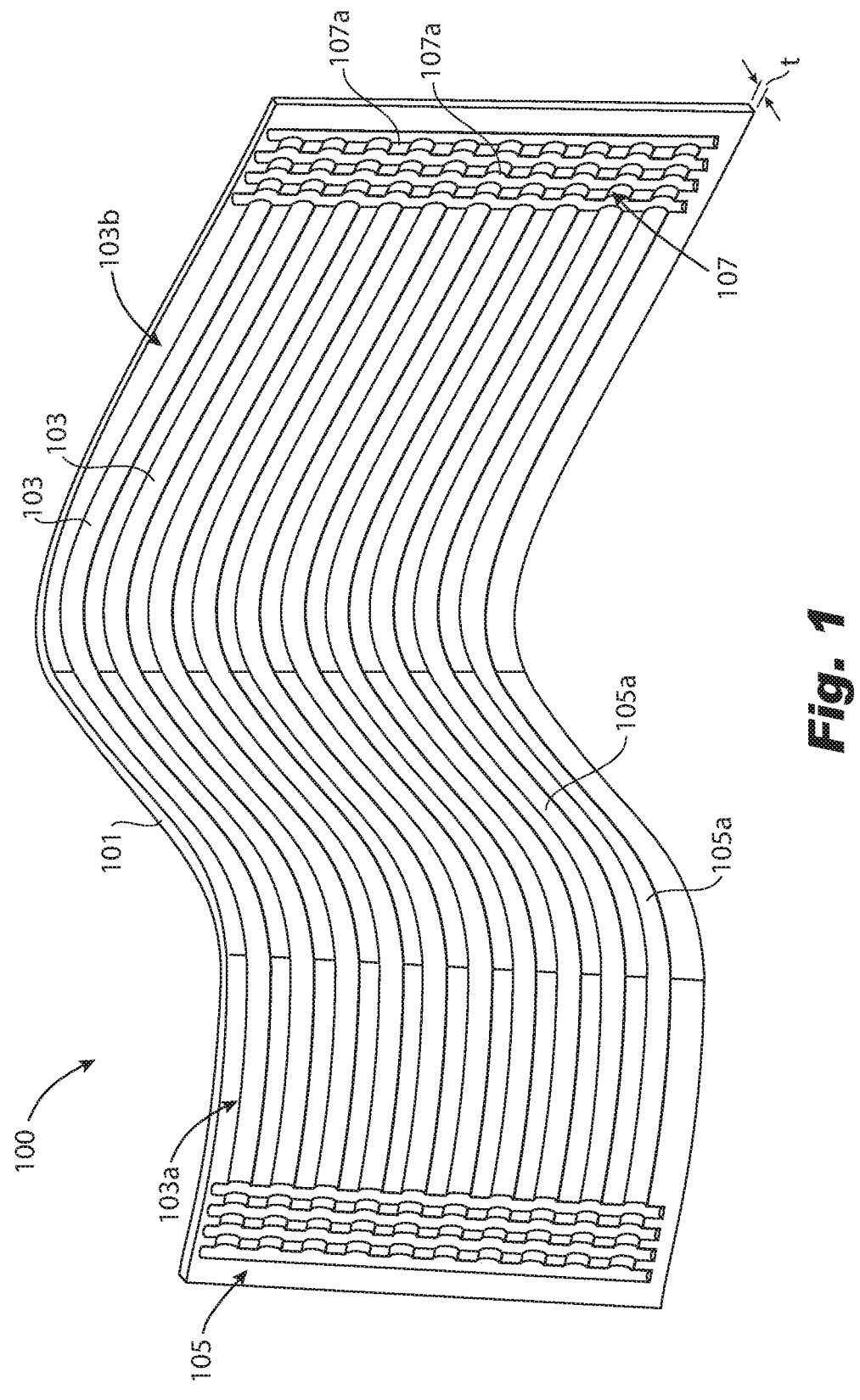
FIG. 1 is a perspective view of an embodiment of a device in accordance with this disclosure.
Figure 2A:
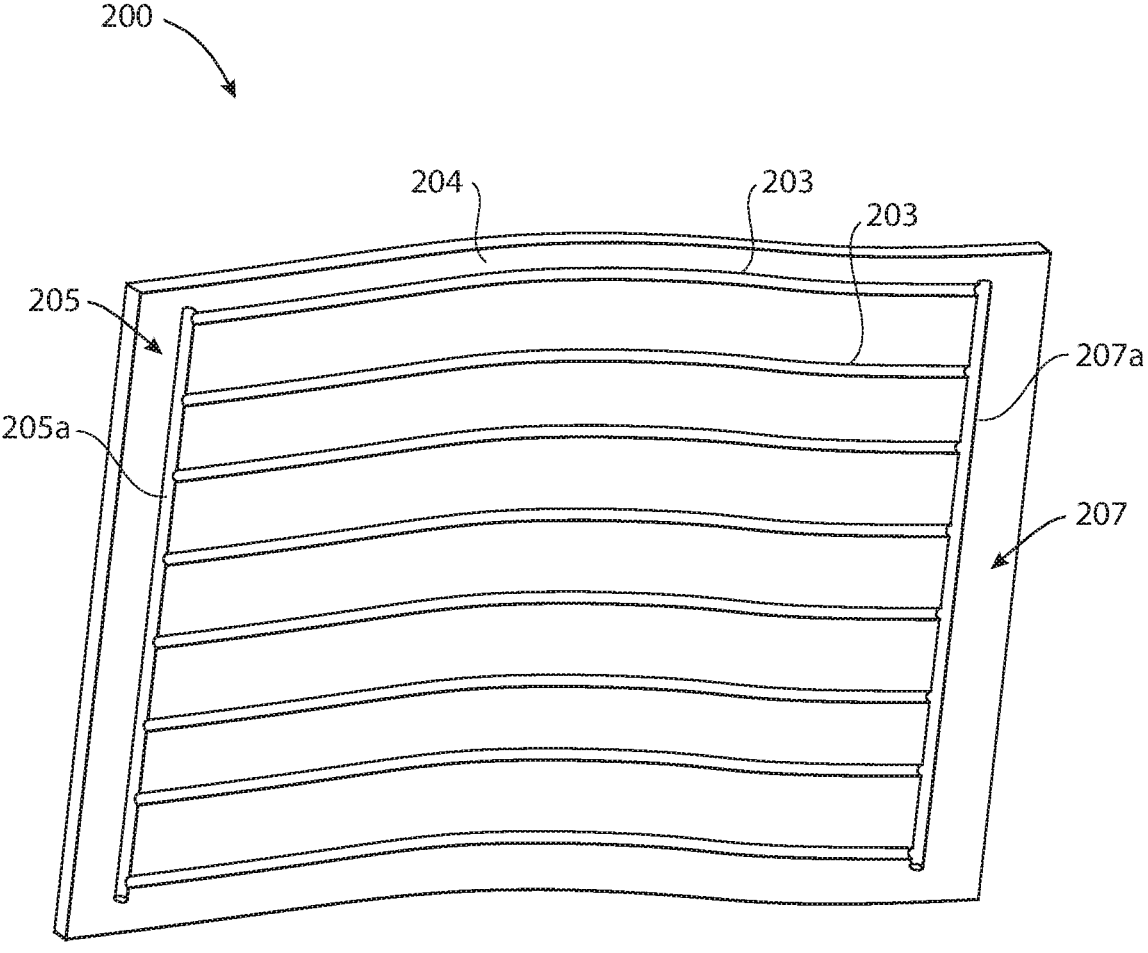
FIG. 2A is a perspective view of another embodiment of a device in accordance with this disclosure.
Figure 2B:
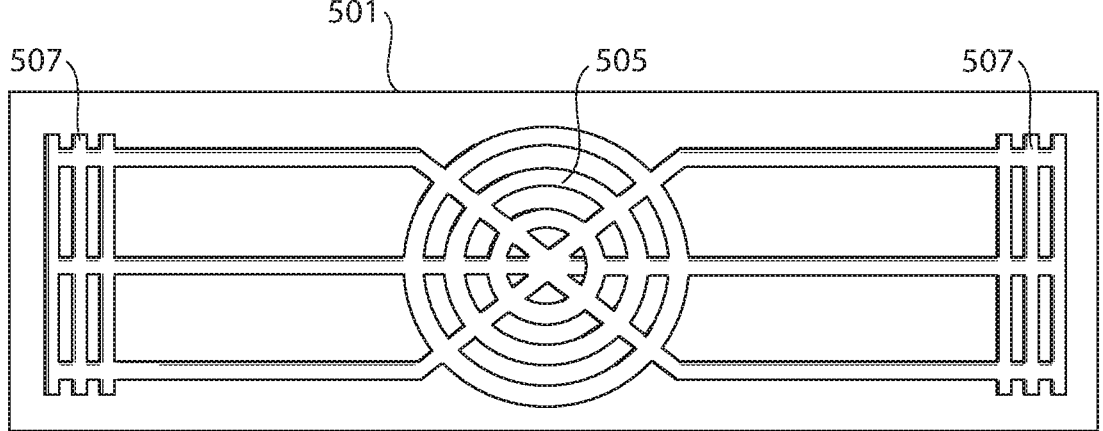
FIG. 2B is a plan view of another embodiment of a device in accordance with this disclosure.
Figure 3:
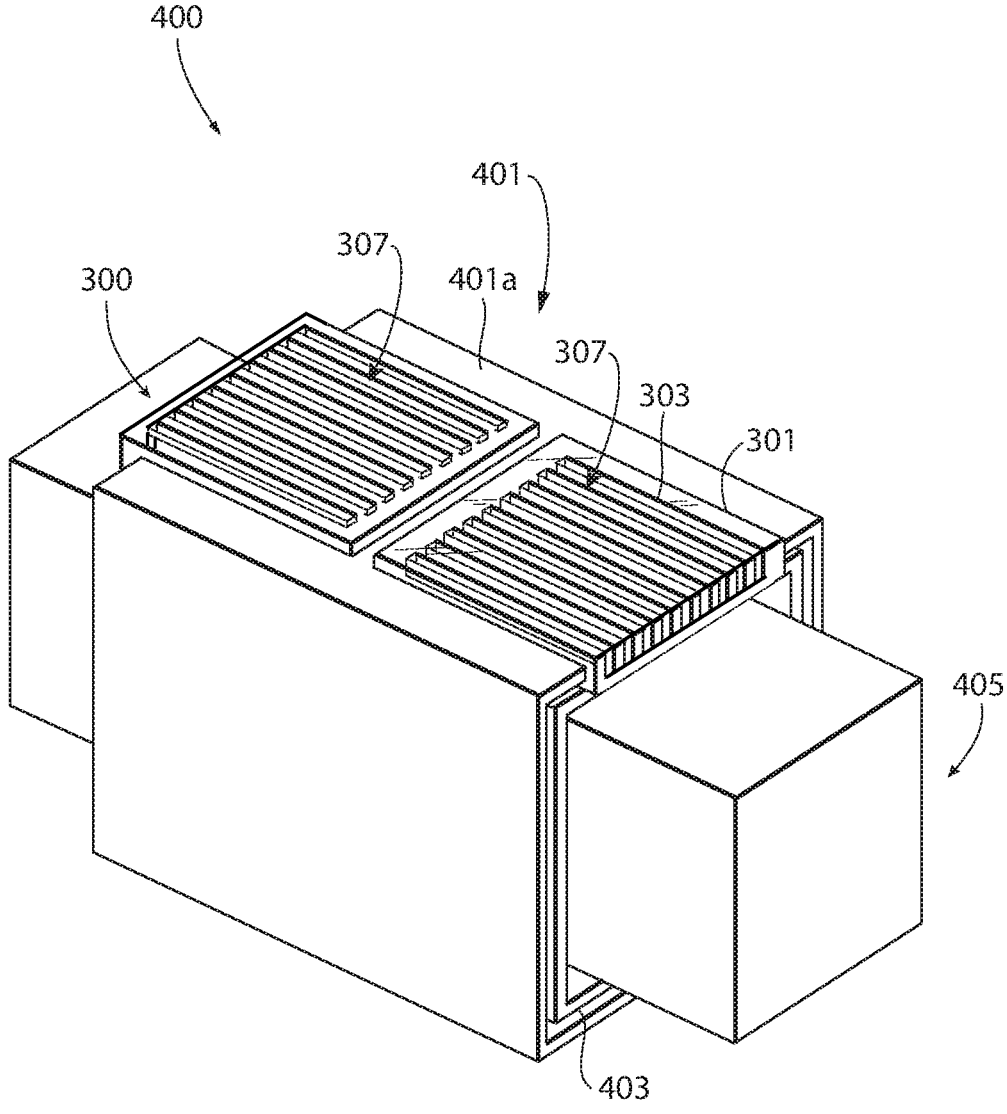
FIG. 3 is a perspective view of an embodiment of an electrical device in accordance with this disclosure, showing an embodiment of a device in accordance with this disclosure compliantly disposed thereon.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2A-3. Certain embodiments described herein can be used to provide efficient high heat transfer, e.g., in complex structures.

Referring to FIG. 1, an oscillating heat pipe device 100 can include a monolithic body 101 formed to be at least partially flexible. The device 100 can include one or more channels 103 within the body 101 and defined by the body 101. As shown, the one or more channels 103 can be defined to run along a longitudinal direction of the body 101.

The device 100 can include an evaporator portion 105 within the body 101 (e.g., at a first end 103a of the one or more channels 103 as shown in FIG. 1). The evaporator portion 103 can be in fluid communication with the one or more channels 103.

The device 100 can include a condenser portion 107 within the body 101 spaced from the evaporator portion 103 (e.g., at a second end 103b of the one or more channels 103). The condenser portion 107 can be in fluid communication with the one or more channels 103. Any suitable number of evaporator portions 105 and/or condenser portions 107 and in any suitable locations within the body 101 are contemplated herein.

The body 101 can be configured to flex (e.g., material flexure, not joint bending) at least between the evaporator portion 105 and the condenser portion 107. The monolithic body 101 can be configured to be at least partially flexible such that no weakened portions or other bendable structure (e.g., a bellows) are required between the evaporator portion 105 and the condenser portion 107. In certain embodiments, the body 101 can have a smooth outer shape (e.g., a rectangular shape when flat or any other suitable smooth shape) without weakened portions or other bendable structure). For example, the entire thickness of the body 101 can be configured to materially flex. In certain embodiments, the entire body 101 can be made of a uniform flexible material.

The device 100 can include a heat transfer fluid trapped within the channels to transfer heat between the evaporator portion 105 and the condenser portion 107. The one or more channels 103 can be configured to allow transfer of heat transfer fluid between the evaporator portion 105 and the condenser portion 103. The heat transfer fluid can be configured to boil at the evaporator portion 105, and to allow transfer of liquid (e.g., via capillary effect) to replace the gas at the evaporator portion 105. The gas can travel to the condenser portion 107 where heat can be removed and the gas can be converted back into liquid.

The body 101 can be made at least partially (e.g., entirely) of a flexible material in certain embodiments. For example, the flexible material can include at least one of silicone or elastomeric polyurethane. Any other suitable material is contemplated herein (e.g., Polyether block Amide (PEBA), any suitable dielectric, etc.).

In certain embodiments, the material can be thermally insulative. However, the heat transfer coefficient of the device 100 can be higher than the thermally insulative material alone. In this regard, a thermally insulative material can be used in an efficient thermal transfer structure. For example, a dimension of the one or more channels 103 and a thickness "t" of the body 101 can be selected to act as a thermal conductor. In certain embodiments, the dimension of the one or more passages can be between about 0.5 mm to about 5 mm, and the thickness "t" of the body 101 can be about between about 1 mm to about 10 mm total. In certain embodiments, the material can be electrically insulative.

It is contemplated that the body 101 can be made of a thermally and/or electrically conductive material (e.g., a flexible thermally conductive material, or a sufficiently thin non-flexible material so that the body 101 is still at least partially flexible). In certain embodiments, the condenser portion 107 and/or the evaporator portion 105 can have a different material (e.g., a thermally conductive material, e.g., metal) than the portion of the body 101 therebetween (e.g., which can be made of a flexible thermally insulative material).

The one or more channels 103 can include a plurality of channels 103 oriented parallel or otherwise complementary to each other (e.g., as shown in FIGS. 1-3). The condenser portion 107 and the evaporator portion 105 can include one or more cross-channels 105a, 107a extending at least partially transverse to and fluidly connected to at least a plurality of the one or more channels 103 (e.g., all of a plurality of channels 103).

In certain embodiments, the one or more cross-channels 103 can include a plurality of cross-channels 105a, 107a, e.g., a shown in FIG. 1. As shown in FIG. 2A, it is contemplated that the evaporator portion 205 and the condenser portion 207 of in the body 201 of a device 200 can include a single cross-channel 205a, 205b connected to one or more the channels 203. As shown in FIG. 2B, the evaporator portion 505 can be located in a middle (or other suitable intermediate part) and the condenser portion 507 can be at one or more ends of the body 501 (or vice versa). As shown, the evaporator portion 505 can be constructed of one or more circular channels in fluid communication with the condenser portion 507 and/or other channels, e.g., as disclosed above.

Any other suitable construction for the evaporator portion 105, 205, 505 and/or condenser portion 107, 207, 507 is contemplated herein. For example, it is contemplated that the evaporator portion and the condenser portion need not include a cross-channel. In certain embodiments, the evaporator portion and/or condenser portion can include only a termination of each channel 103, 203.

The one or more channels 103, the evaporator portion 105, and the condenser portion 107 can be formed to be sealed such that the heat transfer fluid is trapped therein. In certain embodiments, the body 101, 201 can be formed to include one or more access channels to allow fluid to be added after construction of the body 101, 201. It is contemplated that the one or more access channels can be sealed, valved, or otherwise enclosed.

The body 101, 201 can be shaped to be conformal to a structure (e.g., outer surface 401a as shown in FIG. 4, to fit to an outer surface or a feature of a curved structure, or any other suitable structure or shape). In certain embodiments, e.g., as shown in FIGS. 1 and 2A, the body 101, 201 can include a curved shape, and/or can flex to be curved. In certain embodiments, e.g., referring to the embodiment of a device 300 of FIG. 3, the body 301 can include a clip shape (e.g., a u-shape to fit and/or provide a retain force around a structure). Any other suitable shape is contemplated herein.

Certain embodiments of a device, e.g., 100, 200, 300 disclosed herein, e.g., as described above, can be additively manufactured (e.g., powder bed fusion, deposition, or any other suitable method). Any other suitable method to manufacture one or more embodiments are contemplated herein.

In accordance with at least one aspect of this disclosure, as shown in FIG. 3, an electrical apparatus 400 can include one or more electrical components 401 (e.g., an inductor coil) that generate heat in use. An oscillating heat pipe device 300 can be disposed on the one or more electrical components 401 and configured to transfer heat from the one or more electrical components 401. The device 300 can be any suitable device disclosed herein (e.g., as described above). For example, the body 301 can have a clip shape as shown (e.g., such that the body 301 and channels 303 have a u-shape).

In certain embodiments, the one or more electrical components 401 can include one or more windings of an electric motor, for example. The device 300 (and/or a plurality thereof as shown) can be compliantly disposed around the one or more windings to clip to the one or more windings (e.g., to apply a retaining force thereto).

In certain embodiments, the condenser 307 can be disposed on an outer surface 401a of the one or more windings, and the evaporator (not shown) can be disposed on an inner surface (not shown) of the one or more windings. In certain embodiments, e.g., as shown in FIG. 3, the evaporator can be sandwiched between a plurality of windings 401, 403 of the one or more windings, for example. For example, heat can be generated between the two layers of wires, and can be brought to outside using the device 300 while also providing a layer of electrical insulation. In certain embodiments, the apparatus 400 can include a core 405 disposed within the one or more windings. Any other suitable structure is contemplated herein. Embodiments of a device (e.g., as shown in FIGS. 1-3) can be utilized with any other suitable application.

In accordance with at least one aspect of this disclosure, a method can include additively manufacturing a flexible oscillating heat pipe device out of a flexible material. The flexible material can include at least one of silicone or elastomeric polyurethane. Any other suitable material (e.g., a metal, and alloy, a polymer, or any other suitable compound) for additive manufacturing is contemplated herein. The method can include any other suitable method(s) and/or portion(s) thereof.

Embodiments can utilize additive manufacturing to create one or more oscillating heat pipe devices out of flexible materials. Embodiments can even utilize thermally insulative materials, counterintuitively. In certain embodiments, if the selected material is insulative, the device can be designed to be thin enough to still act as a thermal conductor. The shape of the device can be application specific, e.g., clip shaped as shown in FIG. 3. In certain embodiments, a device 100 can be planar and formed into a bent clip shape (e.g., as shown in FIG. 3) and/or attached to the structure with a thermally conductive adhesive.

Embodiments disclosed herein include an oscillating heat pipe structure with enclosed channels with a two phase heat transfer fluid material disposed therein. OHPs operate by passively oscillating fluid that transfers between an evaporator and condenser due to instability (e.g., bubbles boil out and can cause liquid to effectively move due to capillary forces). The liquid replaces gas where gas is made at the evaporator. This type of heat transfer is much more efficient than just a simple solid conductive element. Additive manufacturing techniques allow for 3D printing of materials with great mechanical performance, e.g., to print flexible objects. Additive fabrication techniques also enable geometries that previously were not feasible. Certain embodiments include manufacturing of flexible additively fabricated OHPs, and integrating flexible OHPs with electronics components to serve as both as an electrically insulating layer and thermal conductors as needed. Material such as EPU, FPU, Silicone, and flexible thermally conductive composites can be utilized, for example. Flexible heat pipes can be integrated into components more easily than traditional heat transfer devices. Embodiments can have multi-functionality as electrical insulators and thermal conductors, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An oscillating heat pipe device, comprising:
a monolithic body formed to be flexible;
one or more channels within the body and defined by the body;
an evaporator portion within the body and in fluid communication with the one or more channels; and
a condenser portion within the body spaced from the evaporator portion and in fluid communication with the one or more channels, wherein the body is configured to flex at least between the evaporator portion and the condenser portion, wherein the body is made at least partially of a flexible material, wherein the flexible material includes at least silicone, wherein the flexible material is thermally insulative, wherein a heat transfer coefficient of the device is higher than that of the flexible material alone, wherein a dimension of the one or more channels and a thickness of the body are selected for the device to act as a thermal conductor.

2. The device of claim 1, further comprising a heat transfer fluid trapped within the one or more channels to transfer heat between the evaporator portion and the condenser portion.

3. The device of claim 1, wherein the flexible material includes elastomeric polyurethane.

4. The device of claim 1, wherein the dimension of the one or more channels is between about 0.5 mm to about 5 mm, and the thickness of the body is between about 1 mm to about 10 mm total.

5. The device of claim 1, wherein the flexible material is electrically insulative.

6. The device of claim 1, wherein the body is shaped to be conformal to a structure.

7. The device of claim 6, wherein the body includes a clip shape.

8. The device of claim 1, wherein the one or more channels include a plurality of channels oriented parallel or otherwise complementary to each other.

9. The device of claim 8, wherein the condenser portion and the evaporator portion include one or more cross-channels extending at least partially transverse to and fluidly connected to at least a plurality of the one or more channels.

10. The device of claim 9, wherein the one or more cross-channels include a plurality of cross-channels.

11. An electrical apparatus, comprising:

one or more electrical components that generate heat in use; and an oscillating heat pipe device disposed on the one or more electrical components and configured to transfer the heat from the one or more electrical components, the device comprising:

a monolithic body formed to be flexible;

one or more channels within the body and defined by the body;

an evaporator portion within the body and in fluid communication with the one or more channels; and a condenser portion within the body spaced from the evaporator portion and in fluid communication with the one or more channels, wherein the body is configured to flex at least between the evaporator portion and the condenser portion, wherein the body is made at least partially of a flexible material, wherein the flexible material includes silicone, wherein the flexible material is thermally insulative, wherein a heat transfer coefficient of the device is higher than that of the flexible material alone, wherein a dimension of the one or more channels and a thickness of the body are selected for the device to act as a thermal conductor.

12. The apparatus of claim 11, wherein the one or more electrical components include one or more windings of an electric motor.

13. The apparatus of claim 12, wherein the device is compliantly disposed around the one or more windings to clip to the one or more windings.

14. The apparatus of claim 13, wherein the condenser portion is disposed on an outer surface of the one or more windings, wherein the evaporator portion is disposed on an inner surface of the one or more windings.

15. The apparatus of claim 14, wherein the evaporator portion is sandwiched between a plurality of windings of the one or more windings.

* * * * *